G. R. DAVIDSON.
WHEEL.
APPLICATION FILED JUNE 22, 1914.
1,177,763.
Patented Apr. 4, 1916.
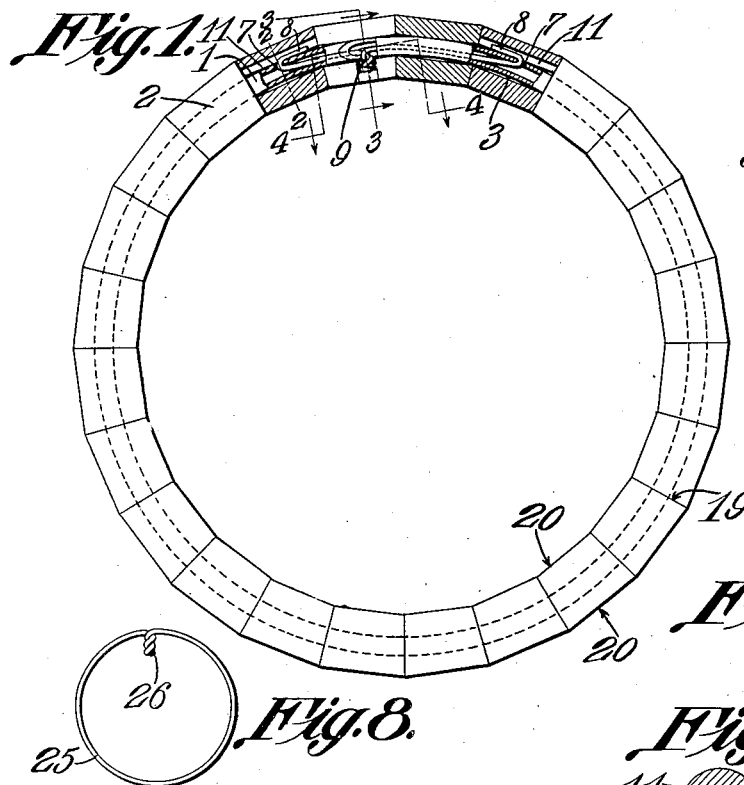
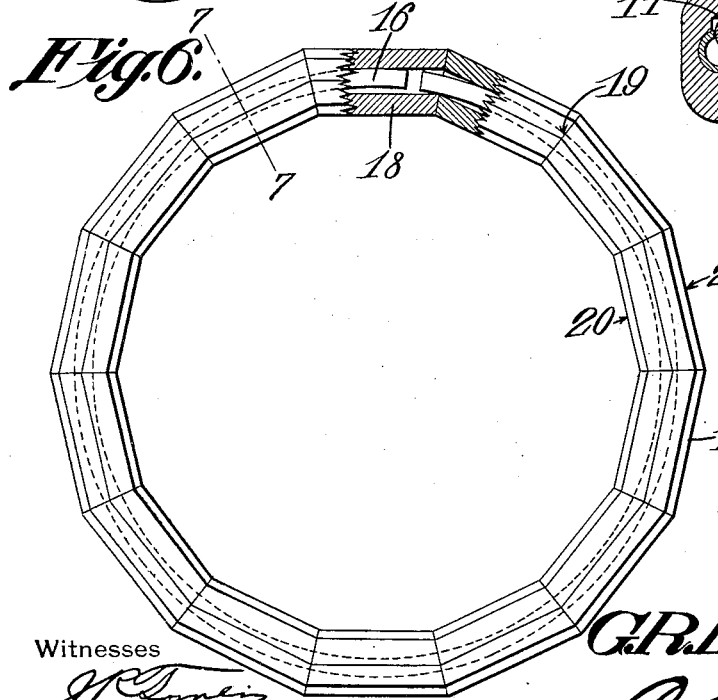
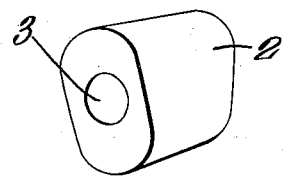
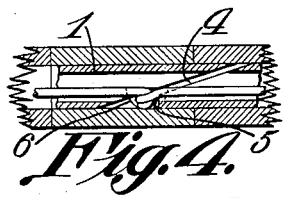
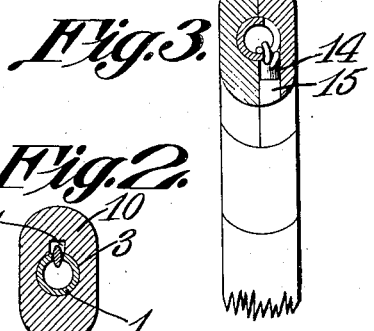
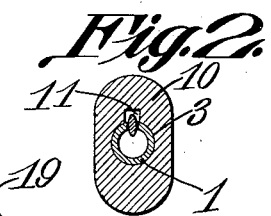
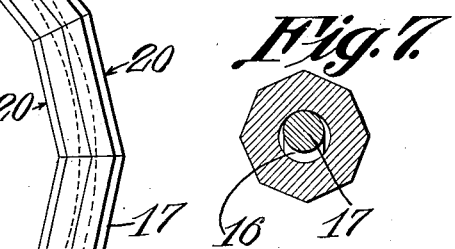
Witnesses
G. R. Davidson, Inventor
by C. A. Snow & Co.
Attorneys

UNITED STATES PATENT OFFICE.

GEORGE ROBERT DAVIDSON, OF LENOX, MICHIGAN.

WHEEL.

1,177,763.  Specification of Letters Patent. Patented Apr. 4, 1916.

Application filed June 22, 1914. Serial No. 846,635.

*To all whom it may concern:*

Be it known that I, GEORGE R. DAVIDSON, a citizen of the United States, residing at Lenox, in the county of Macomb and State of Michigan, have invented a new and useful Wheel, of which the following is a specification.

The device forming the subject matter of this application is a rim of that general type which is employed upon steering wheels and the like.

One object of the present invention is to provide a rim the constituent sections of which may be united without steaming or bending, the construction being such that the constituent sections of the rim may expand and contract readily, without affecting the rigidity of the wheel.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing: Figure 1 shows in side elevation, a hand wheel rim constructed in accordance with the present invention, parts being broken away; Fig. 2 is a cross section on the line 2—2 of Fig. 1; Fig. 3 is a cross section on the line 3—3 of Fig. 1; Fig. 4 is a longitudinal section on the line 4—4 of Fig. 1; Fig. 5 is a perspective view depicting one of the constituent sections of the rim; Fig. 6 is a side elevation showing a modified form of the invention, parts being broken away; Fig. 7 is a cross section on the line 7—7 of Fig. 6; Fig. 8 is a plan illustrating a slight modification of the invention.

In carrying out the invention as depicted in Figs. 1, 2, 3, 4 and 5 there is provided a resilient, severed ring preferably in the form of a metallic tube 1.

The invention contemplates the use of a plurality of sections denoted generally by the reference character 2. These sections 2 may be made of any desired material and they may be of any length and of any cross sectional contour. They may be rigid or flexible the latter construction being preferred when the sections are of considerable length. The sections 2 are provided with openings 3 receiving the tube 1 closely.

The meeting ends of the tube 1 are beveled off for coöperation with each other as indicated at 4. One of the beveled ends 4 of the tube 1 is cut off transversely as shown at 5, so that there exists an opening 6 in the wall of the tube. The ends of the tube are provided with openings 7 adapted to receive hooks 8, the ends of which are twisted together as shown at 9, the twisted portions 9 of the hooks passing outwardly through the opening 6. Certain of the sections, denoted by the numeral 10 are provided with grooves 11 communicating with the axial openings 3. These grooves 11 receive the remote ends of the hooks 8, as will be understood best from Figs. 1 and 2.

In closing up the rim, a pair of half sections 12 are employed, these sections abutting against each other, transversely of the rim, as Fig. 3 will clearly show. One of the sections 12 is provided with a radial opening 14 adapted to receive the twisted portions 9 of the hooks 8, and into the opening 14 a plug 15 may be inserted if desired. The rim, constructed as above described, is in condition to be covered, in the usual manner and to be assembled with the spider (not shown).

The ring or tube 1 is resilient and its ends may be swung laterally out of alinement, to permit the several sections 2 to be threaded onto the ring or tube. When the ends of the tube are released, the same will spring to axial alinement and will exert a prehensile action on all of the sections, tending to hold the same in terminal abutment.

In Figs. 6 and 7, a modified form of the invention is shown, the ring being in the form of a rod 16 and the sections being shown at 17. The ends of the ring 16 lies within the contour of one of the sections, denoted specifically by the numeral 18.

In Fig. 6, the sections are shown as longer than the sections in Fig. 1 and it will thus be understood that the sections may be of any desired length. Further, noting Fig. 7 and comparing the same with Fig. 2 it will be obvious that the sections may be made of any desired contour.

As indicated at 19, the ends of the sections in both forms of the invention are cut off radially so as to form a tight joint. The opposed lateral faces of each section preferably are parallel as at 20 and the sections, therefore, if made of wood may be turned out readily upon a lathe adapted to form irregular shapes. Instead of fashioning the sections on a lathe, the same may be run out in long pieces on a molding machine, and then sawed to the right lengths and at the proper miter.

In Fig. 8 a modification of the invention is shown, the feature delineated in Fig. 8 relating particularly to that form of the invention which is disclosed in Fig. 1. In place of the hooks 8 as shown in Fig. 1, a single length of wire 25 may be employed, the ends thereof being twisted together as shown at 26.

Having thus described the invention, what is claimed is:—

1. A hand wheel rim embodying sections, a severed tube passing through the sections and having coöperating beveled ends, one of which beveled ends is shorter than the other, to define an opening in the tube; and a securing device in the tube, the ends of the securing device being united and lying in the opening.

2. A hand wheel rim embodying a tube; sections having openings receiving the tube and provided with grooves which communicate with the openings; hooks engaged in the ends of the tube, the hooks at one end lying in the grooves; the other ends of the hooks being united.

3. A hand wheel rim embodying a tube having coöperating beveled ends, one of the beveled ends being shorter than the other to define an opening in the tube; sections having openings through which the tube extends, the sections being provided with grooves communicating with the openings; hooks located within the ends of the tubes and having their outer ends received in the grooves, the hooks being united, and the united portions of the hooks lying in the first specified opening.

4. A hand wheel rim embodying a tube, one of the ends of which is provided with an opening; securing devices located in the ends of the tube, the securing devices being interengaged, and the interengaged portions of the securing devices lying in the opening; and opposed, coöperating sections applied to the tube, one of the sections having an opening receiving the interengaged portions of the securing devices.

5. A steering wheel rim made up of a plurality of main tubular sections, certain of which are provided with internal longitudinal grooves; a tube extended through the sections, the ends of the tube being beveled and being overlapped, and one beveled end of the tube being cut off at the end to define an opening in the tube; a pair of hooks engaged through the walls of the tube at its ends, the bills of the hooks lying in the longitudinal grooves, and the shanks of the hooks being interengaged and being extended through the opening; and an auxiliary tubular section disposed between certain of the main sections and comprising laterally separable parts, one of which parts is provided with an opening receiving the interengaged shanks of the hooks.

In testimony that I claim the foregoing as my own, I have hereto affixed my signature in the presence of two witnesses.

GEORGE ROBERT DAVIDSON.

Witnesses:
 WM. R. DAVIDSON,
 WESLEY BLUHM.